United States Patent [19]

Malm

[11] Patent Number: 5,218,485
[45] Date of Patent: Jun. 8, 1993

[54] EXPANDED DYNAMIC RANGE IMAGE DIGITIZING APPARATUS

[75] Inventor: Robert E. Malm, Pacific Palisades, Calif.

[73] Assignee: X-ray Scanner Corporation, Torrance, Calif.

[21] Appl. No.: 680,950

[22] Filed: Apr. 5, 1991

[51] Int. Cl.[5] .............................. G02B 5/22
[52] U.S. Cl. ..................... 359/885; 359/891; 430/6
[58] Field of Search ............... 359/885, 890, 891, 889, 359/359, 350, 361; 430/7, 6; 362/293; 358/447, 448

[56] References Cited

U.S. PATENT DOCUMENTS

| | | | |
|---|---|---|---|
| 3,165,406 | 1/1965 | Murray | 359/891 |
| 3,728,014 | 4/1973 | Rosenblum | 359/891 |
| 4,093,346 | 6/1978 | Nishino et al. | 359/885 |

*Primary Examiner*—Loha Ben
*Attorney, Agent, or Firm*—Robert E. Malm

[57] ABSTRACT

The expanded-range image digitizing apparatus utilizes a light-attenuating layer in concert with solid-state light detectors of limited dynamic range to provide a means for digitizing wide-dynamic-range images. The light-attenuating layer is placed in close contact with an image-containing medium. The light-attenuating layer is comprised of groups of regions replicated throughout the light-attenuating layer where each region in a group attenuates light passing through to a different degree and each group is the same in size and shape as a picture element of the image being digitized. When the image-containing medium is illuminated, the emerging light power from one of the regions of a group is of the proper magnitude to cause an associated detector to respond within its dynamic range. The emerging light power from the corresponding picture element of the image is then determined by multiplying the detected light power by the attenuation factor of the region producing the proper detector response.

19 Claims, 3 Drawing Sheets

EXPANDED DYNAMIC RANGE IMAGE DIGITIZING APPARATUS

BACKGROUND OF INVENTION

This invention relates generally to image digitizing apparatus that facilitates the storage in digital computers of images recorded as spatial variations in reflectivity or transmissivity of two-dimensional storage media. More specifically, the invention relates to image digitizing apparatus that can accurately perform the digitizing function on recorded images having exceptionally wide dynamic ranges.

The pictorial data recorded in two-dimensional media can be described to any degree of desired accuracy by a two-dimensional array of picture elements ("pixels") quantified in terms of the reflectivities or transmissivities of the medium at the particular coordinates of the pixels.

The pixel density required for an adequate description of the pictorial data depends on the spatial frequency content of the data and the degree of accuracy desired in reconstructing the pictorial data from the derived pixel data. The finer the detail in the original pictorial data, the greater must be the pixel density to adequately represent the pictorial data. And the greater the pixel density, the greater must be the spatial resolution of the image digitizing apparatus, the more precise must be the mechanical operations performed by the apparatus in extracting the pixel data from the image-containing medium, and the more time consuming is the performance of the digitizing function. Thus, economic considerations dictate that the spatial resolution of the image digitizing apparatus should be no greater than the image detail demands.

The fidelity with which images can be reconstructed from pixel data depends not only on pixel density but also on the accuracy of representation of the reflectivity or transmissivity of each pixel. Solid-state light detectors, which are typically used in image digitizing equipments to convert the imaged light from pixels into electrical signals, have dynamic ranges between a few hundred and a thousand, dynamic range being the ratio of the maximum output signal of the detector when illuminated with light and the noise output in the absence of light illumination. Dynamic ranges falling within this range are adequate for many categories of image-containing media.

However, certain image categories, like medical x-ray diagnostic film, have dynamic ranges an order of magnitude greater. Image digitizing apparatus that can accommodate dynamic ranges of this magnitude generally involve the use of photomultiplier tube light detectors, a costly alternative to solid-state detectors. If a way could be found for accomplishing the image digitizing function with less-expensive solid-state light detectors, the utilization of computers in the transmission, processing, and display of medical x-ray data could be vastly expanded.

The obstacle that presently stands in the way of such progress is the limited dynamic range of solid-state detectors. Some simple means for effectively expanding the dynamic range of such detectors is needed to fully realize the diagnostic utility of medical x-ray film.

SUMMARY OF THE INVENTION

The conceptual basis of the invention is the possibility of expanding the dynamic range of a light detector by the simple expedient of incorporating greater spatial resolution in the image-digitizing apparatus than the image-containing media would seem to demand.

Image-digitizing apparatus is comprised of a support means for the image-containing medium, a light source illuminating the image-containing medium, a detector array for converting incident light energy into electrical signals, a lens system that gathers the light reflected from or transmitted through particular pixels and images this light on particular detectors, a transport means for positioning the source of illumination, the lens system, and the detector array relative to the support means for the image-containing medium, and electronic means for reading out and processing the detector signals and for controlling the operation of the image-digitizing apparatus.

The invention improves on the aforementioned image-digitizing apparatus by affixing a spatially-selective light-attenuating layer to the support means. The image-containing medium rests on and is in close contact with the light-attenuating layer. The light-attenuating layer is comprised of a plurality of resolution elements ("resels") in contact with each pixel of the image-containing medium. The plurality of resels in contact with each pixel attenuate the light passing therethrough by different amounts.

The lens system is so designed that the light from each resel is imaged on an associated detector—either one detector in time sequence or on a plurality of detectors simultaneously. Typically, the light energy from one of the resels will be of a proper magnitude to cause its associated detector to produce a signal within the detector's dynamic range. The light-attenuating layer thereby permits wide-dynamic-range images to be accurately digitized using light detectors with limited dynamic ranges.

It is necessary, of course, for the image-digitizing apparatus to have a spatial resolution capability sufficient to resolve the individual resels associated with each pixel. This capability is, however, more easily provided than the wide-dynamic-range light detectors that would otherwise be required.

One of the objects of the invention is to provide exceptionally-wide dynamic range image-digitizing apparatus appropriate for digitizing wide-dynamic-range imagery. Another object is to utilize low-cost solid-state light detectors in providing this capability. Still another object is to provide this capability within the framework of present image-digitizing apparatus designs.

DESCRIPTION OF THE PREFERRED EMBODIMENT

Figure 1:
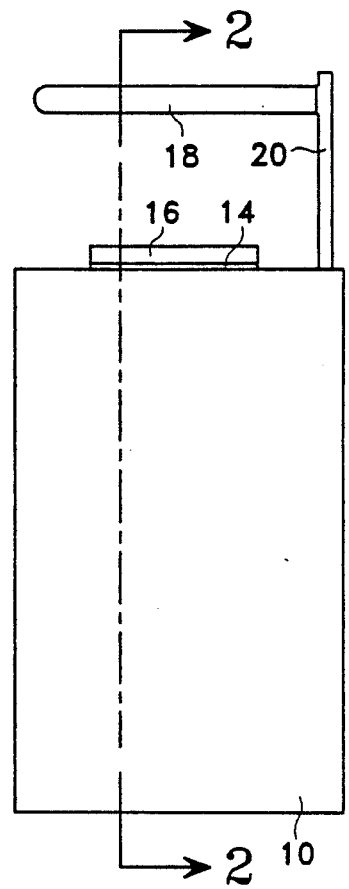
FIG. 1 is a front view of an improved image-digitizing apparatus of the type that scans and converts an image a line at a time.
Figure 2:
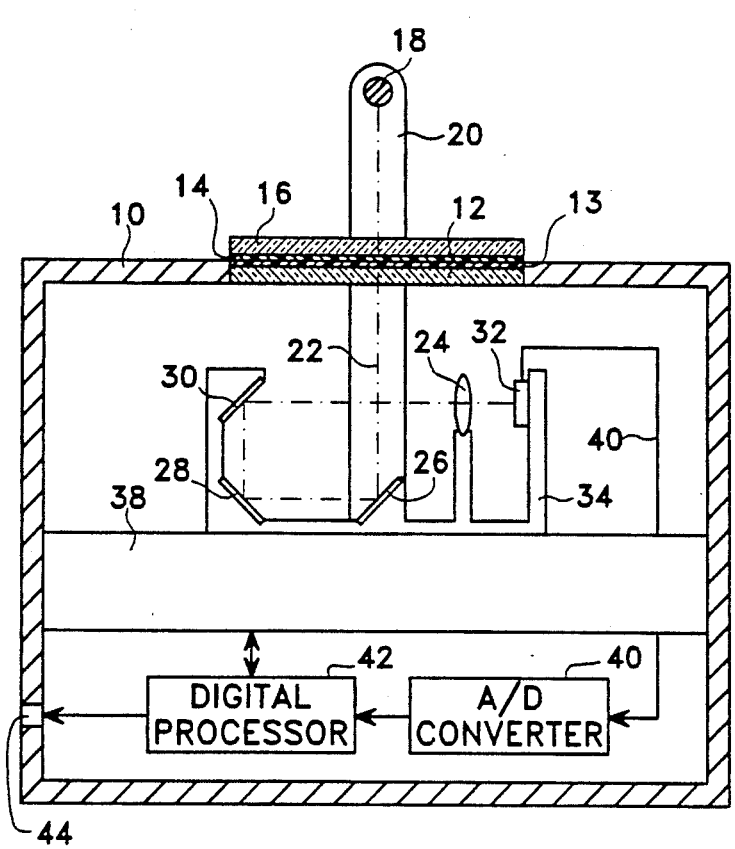
FIG. 2 is side sectional view of the improved image-digitizing apparatus of FIG. 1 taken on the plane indicated in FIG. 1 and including a functional depiction of the electronic processing units.

An end view of a line-by-line image-digitizing apparatus incorporating the expanded dynamic range capability is shown in FIG. 1. A side sectional view of the apparatus taken at the plane indicated in FIG. 1 is shown in FIG. 2. The case 10 serves to support and enclose the other parts of the apparatus. The support means, comprised of a transparent support panel 12 in intimate contact with a light-attenuating layer 13, is mounted in a top opening of case 10 and provides a transparent support surface for an image-containing medium 14 and also selectively attenuates the light passing through each of the resolution elements ("resels") on the panel. The transparent pressure plate 16 keeps the image-containing medium 14 in close contact with the support means 12, 13.

The elongated light source 18 supported by the bracket 20 extending through an opening in the case 10 serves to illuminate the image-containing medium 14. The light from a line of resolution elements ("resels") in the image-containing medium 14, following the path 22, is collected by the lens 24 in concert with the mirrors 26, 28, and 30 and imaged on a linear array of detectors contained on a detector array and multiplexer integrated circuit chip 32. The bracket 20 which supports the light source 18, the lens 24, the mirrors 26, 28, and 30, and the detector array and multiplexer chip 32 are all attached to the transport platform 34 which is free to move along the transport platform positioning means 38 in a direction parallel to the support means 12, 13 and perpendicular to the rows of resels on the light-attenuating layer.

The positioning of the transport platform 34 is accomplished by the transport platform positioning means 38. The transport platform positioning means 38 is rigidly attached to the case 10.

The outputs from the individual light detectors in the detector array are assembled into a serial stream by a time-division multiplexer that is part of the detector array and multiplexer chip 32 and supplied to the analog-to-digital converter 40. The analog-to-digital converter 40 transforms the amplitudes of the serial analog detector outputs into equivalent binary numbers. The bits of the binary numbers from the analog-to-digital converter 40 are supplied either serially or in parallel to the digital processor 42 which processes the detector data into transmissivity data and makes this data available to external devices at connector 44. The digital processor 42 also receives position and status data from the transport platform positioning means 38 and develops appropriate control signals which it supplies to this mechanism.

Figure 3:
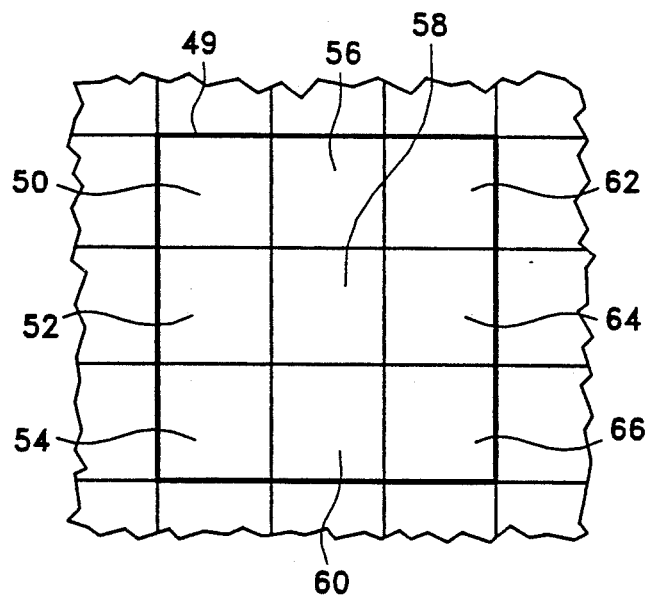
FIG. 3 is a top view of a pixel-sized portion of the light-attenuating layer that is part of the image-digitizing apparatus shown in FIG. 1.

The light-attenuating layer 13, that together with the transparent support panel 12 comprises the support means, is comprised of resel-sized attenuators in identical blocks of nine. A portion of the light-attenuating layer 13 containing a single block 49 is shown in FIG. 3. Each 9-resel block is equal in size to a picture element ("pixel") of the image-containing medium 14 that is targeted for digitization. Each resel attenuator has a different value. For example, the resels in FIG. 3 might be assigned attenuations as follows (where attenuation is defined as the ratio of light power entering to light power emerging, F is a number greater than one, and $F \wedge n$ means F raised to the n'th power):

| Resel Reference No. | Attenuation |
|---|---|
| 50 | 1 |
| 52 | F |
| 54 | $F \wedge 2$ |
| 56 | $F \wedge 3$ |
| 58 | $F \wedge 4$ |
| 60 | $F \wedge 5$ |
| 62 | $F \wedge 6$ |
| 64 | $F \wedge 7$ |
| 66 | $F \wedge 8$ |

The nine resel attenuators thus provide a total attenuation range of $F \wedge 8$ to 1. If, for example, F were equal to four, then the total attenuation range of the resels would be 65,536. By the selection of the appropriate resel as the representative of the pixel, imagery with a dynamic range of 65,536 to 1 could be accurately digitized using a detector having a dynamic range of only 200 to 1.

The process of measuring the power of the emerging light from a particular pixel consists of imaging the light from the block of nine resels corresponding to the particular pixel in one of the following ways: (1) simultaneously on an array of nine detectors, (2) sequentially on one detector, or (3) simultaneously on a group of fewer than nine detectors and sequentially on each group. The light from one of the resels will be found to fall within the dynamic range of its associated detector and that resel is used in calculating the power of the light emerging from a pixel. The transmissivity or reflectivity of a pixel-sized area on the image-containing medium is proportional to emerging light power if the illumination of the image-containing medium is unchanging.

The light-attenuating layer 13 can be affixed to the transparent support panel 12 by well-known techniques for the deposition of thin films. Either opaque or absorptive films can be used. The deposition of an opaque material over only a portion of a resel results in an attenuation equal to the ratio of the uncovered area of the resel to the total resel area. A particular level of attenuation is obtained simply by selecting the appropriate portion of the resel to be covered.

With an absorptive material, a particular level of attenuation is obtained by depositing a certain thickness of the material over the entire resel area.

The light-attenuating layer 13 can also be fabricated separately as a film by photographic techniques and then bonded to the transparent support panel 12 by means of an appropriate adhesive. This procedure first involves the preparation of a drawing of the resel block-of-nine 49 in which each resel is given an appropriate shade of gray corresponding to the desired level of attenuation. Then, the drawing of the resel block is photographed and the resulting negative is stepped-and-repeated on negative film to obtain a full-scale light-attenuating layer 13. The light-attenuating layer 13 is then bonded to the transparent support panel 12 with a transparent-when-dry adhesive.

Figure 4:
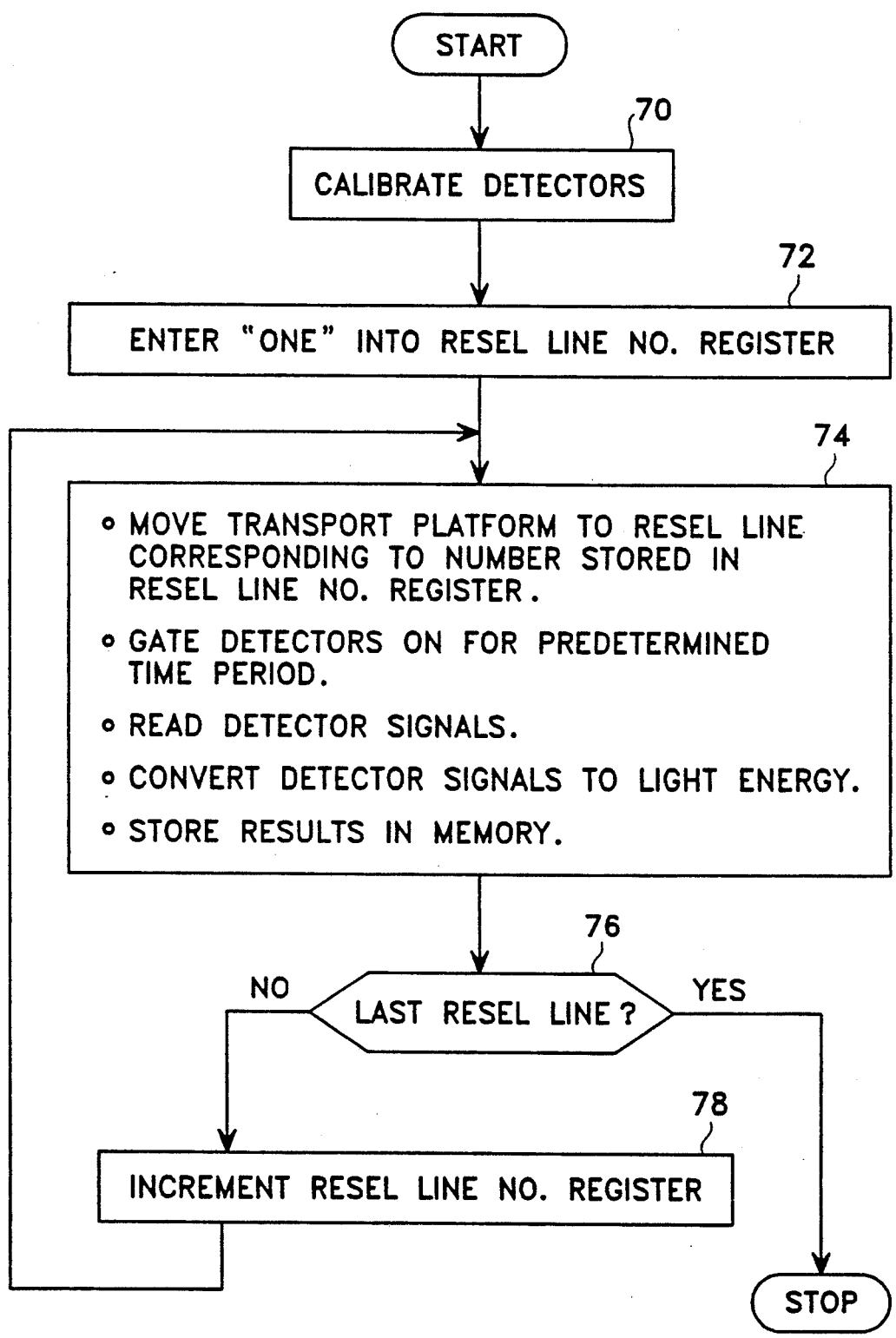
FIG. 4 is a flow diagram which describes the control process performed by the digital processor in gathering the basic image data from which the expanded dynamic range image data is obtained.

The processing of the detector resel data by the digital processor 42 is detailed by the flow diagram shown in FIG. 4 for the line-by-line image digitizing system illustrated in FIGS. 1 and 2.

The first step 70 in the process is to calibrate the detectors so that the light energy to which a detector is exposed can be calculated from the electrical signal level that resulted from the incident light energy. Light energy E is related to detector signal S (in units of charge) by the equation $$S = A*E + B \qquad (1)$$

where A and B are constants, A being the responsivity of the detector and B being a quantity related to the detector dark current, and A*B means A multiplied by B. If A and B are determined, E can be readily calculated from S. The calibration procedure is the process of determining A and B for each detector in the array.

The A and B parameters of a detector can be determined by making two observations: (1) the detector signal in the absence of light (i.e. E=0) and (2) the detector signal when exposed to a known quantity of light (i.e. exposing the detector to a zero-attenuation resel in the absence of an image-containing medium). The two simultaneous equations obtained in this way can then be solved for A and B.

The number of the resel line that is currently being processed is stored in the resel line number register. In step 72 the resel line number is set equal to one.

A series of operations are performed in step 74. The transport platform positioning means 38 (FIGS. 1 and 2) positions the transport platform 34 (FIGS. 1 and 2) such that the resel line with the number corresponding to the one stored in the resel line number register is imaged on the detector array. The detectors are gated in (i.e. made sensitive to incident light) for a predetermined time period. Finally, the digitized detector output signal levels are converted to light energy values and stored in memory.

In step 76, if the last resel line has just been processed, the process comes to an end. If the last resel line has not been processed, the number stored in the resel line number register is incremented and the process repeats beginning with step 74.

The process of transforming the resel light energy E into light power emerging from a pixel or pixel transmissivity T, which is proportional to pixel light power, consists of examining the light energy emerging from the resels in a resel block corresponding to a pixel, selecting that resel light energy that is within a preselected dynamic range segment of the detector, and then appropriately scaling the selected resel light energy to obtain the associated pixel transmissivity.

For purposes of this discussion, it is assumed that the E data is normalized to fall in the range from zero to one. If this data is digitized to N bits, a change amounting to a least significant bit in a light energy of 1/F (where F is an integer greater than zero) represents a fractional change of $\frac{1}{2} \wedge N$ divided by 1/F or F/2 $\wedge$ N. The human eye has a capability of detecting fractional changes in contrast (or light energy) of about 0.02. Thus, to realize the full capability of the human eye, light energy values less than 1/F', where F' can be determined from the equation $$F/2 \wedge N = 0.02 \qquad (2)$$

should not be used. If, for example, N is equal to 8, then by equation (2) F' is equal to 5.12 and use of the light energy data should be restricted to the range from 1/5.12 or 0.195 to 1.

The light energy emerging from a resel in the light-attenuating layer 13 (FIG. 2) must be scaled by the attenuation to obtain a quantity proportional to transmissivity of a pixel on the image-containing medium 14 (FIG. 2). Consequently, the range of transmissivity covered by each of the resels in a block of nine is as follows:

| Resel Reference No. | Transmissivity Range |
|---|---|
| 50 | (1/F TO 1) |
| 52 | F*(1/F TO 1) |
| 54 | F ∧ 2*(1/F TO 1) |
| 56 | F ∧ 3*(1/F TO 1) |
| 58 | F ∧ 4*(1/F TO 1) |
| 60 | F ∧ 5*(1/F TO 1) |
| 62 | F ∧ 6*(1/F TO 1) |
| 64 | F ∧ 7*(1/F TO 1) |
| 66 | F ∧ 8*(1/F TO 1) |

It should be noted that the resel ranges join smoothly together with no gaps and the total dynamic range covered by the resels is F∧9 to 1.

It may not be possible in fabricating an attenuation layer to achieve attenuations of exactly F∧n. However, such precision is not required.

Suppose, for example, the attenuations were as follows:

| Resel Reference No. | Attenuation |
|---|---|
| 50 | 1 |
| 52 | F1 |
| 54 | F2*F1 |
| 56 | F3*F2*F1 |
| 58 | F4*F3*F2*F1 |
| 60 | F5*F4*F3*F2*F1 |
| 62 | F6*F5*F4*F3*F2*F1 |
| 64 | F7*F6*F5*F4*F3*F2*F1 |
| 66 | F8*F7*F6*F5*F4*F3*F2*F1 |

Under these circumstances proper scaling would result in the range of transmissivity covered by each of the resels in a block of nine being as follows:

| Resel Reference No. | Transmissivity Range |
|---|---|
| 50 | (1/F1 TO 1) |
| 52 | F1*(1/F1 TO 1) |
| 54 | F1*F2*(1/F2 TO 1) |
| 56 | F1*F2*F3*(1/F3 TO 1) |
| 58 | F1*F2*F3*F4*(1/F4 TO 1) |
| 60 | F1*F2*F3*F4*F5*(1/F5 TO 1) |
| 62 | F1*F2*F3*F4*F5*F6*(1/F6 TO 1) |
| 64 | F1*F2*F3*F4*F5*F6*F7*(1/F7 TO 1) |
| 66 | F1*F2*F3*F4*F5*F6*F7*F8*(1/F8 TO 1) |

Note once again that the resel ranges join smoothly together with no gaps and the total dynamic range covered by the resels is F1 2*F2*F3*F4*F5*F6*F7*F8.

Figure 5:
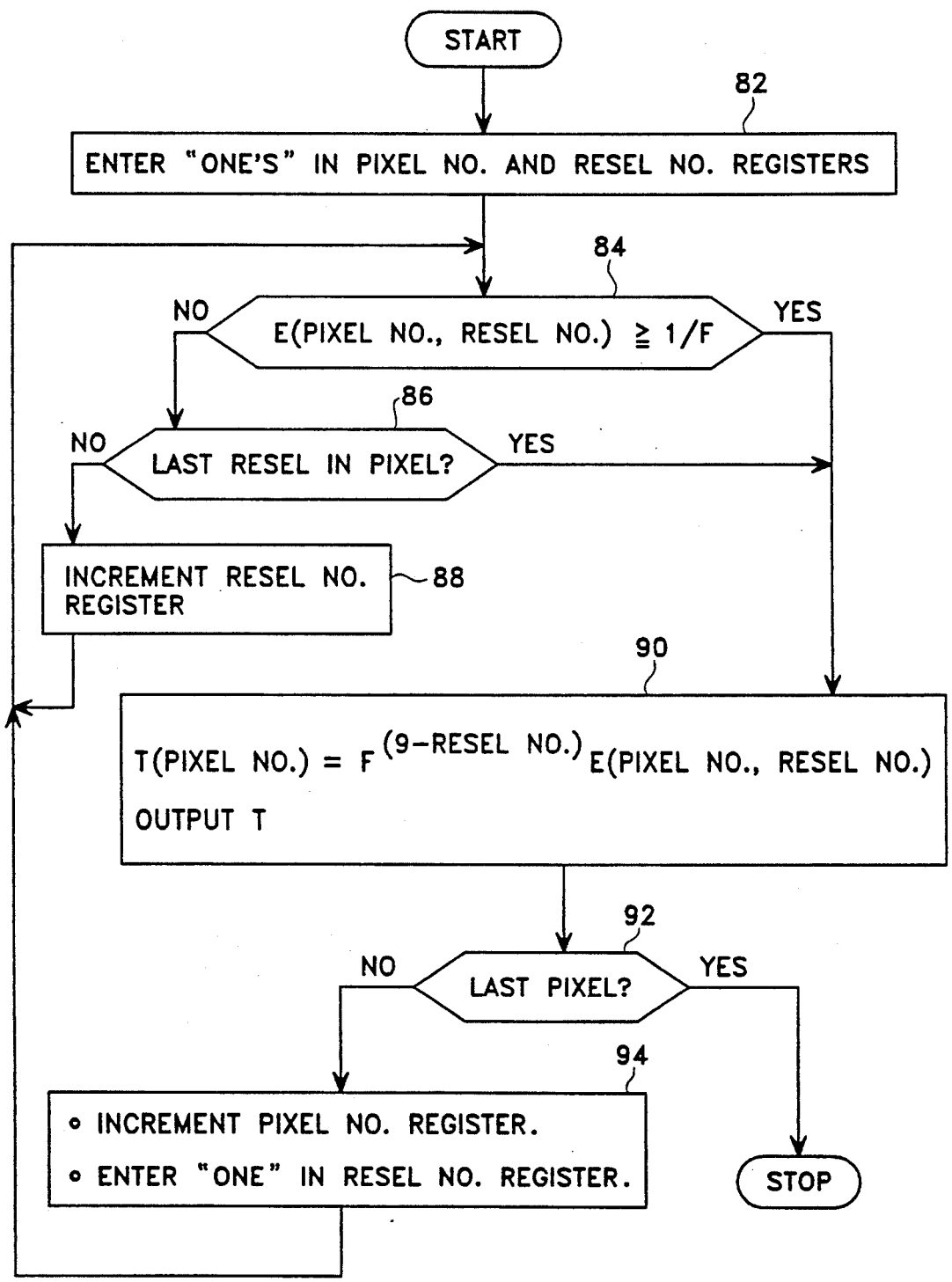
FIG. 5 is a flow diagram which details the process performed by the digital processor in converting raw detector data into image transmissivity or reflectivity data.

The process performed by the digital processor 42 (FIGS. 1 and 2) in determining pixel transmissivity is detailed by the flow diagram shown in FIG. 5.

The functional dependence of light energy on pixel number and resel number is indicated by the expression E(pixel number, resel number) where pixel number uniquely identifies every pixel on the attenuation layer 13 (FIG. 2) and resel number uniquely identifies every resel in a block of nine resels associated with each pixel. It is assumed that the resels are numbered from one to nine in order of decreasing attenuation of the resel attenuators.

The numbers associated with the pixel and resel currently being examined are stored in the pixel number register and the resel number register. In step 82 ones are entered into these registers.

In step 84 the light energy corresponding to the resel and pixel numbers stored in the registers is compared with the threshold level 1/F. If the light energy is below the threshold, step 86 is performed. If the current resel is not the last resel in the block, the resel number stored in the resel number register is incremented in step 88 and the process beginning with step 84 is repeated.

If the light energy equals or exceeds the threshold in step 84 or if the last resel in the block is being processed in step 86, the current light energy value is scaled by the resel attenuation in step 90 and the resulting transmissivity T (in arbitrary units) is outputted.

If the current pixel is the last pixel of the attenuation layer 13 (FIG. 2), step 90 causes the process to end. If the current pixel is not the last pixel, the number stored in the pixel number register is incremented and a one is entered into the resel number register during step 94. Then the process repeats beginning with step 84.

Although the invention has been described in terms of a nine-resel block, it will be evident to one skilled in the art that other block sizes can be used in practicing the invention. It will also be evident to one skilled in the art that the invention is not limited to the line-by-line image digitizing apparatus that is the subject of the preferred embodiment. The invention is also applicable to pixel-by-pixel or group-by-group (where each group contains a plurality of pixels) image digitizing apparatus.

The preferred embodiment of the invention is an image digitizing apparatus for use with image-containing media of the transparency type wherein light from the illuminating source passes through the image-containing medium and is then imaged on a detector array thereby permitting the transmissivity of pixels on the image-containing medium to be determined. However, the invention can also be utilized in digitizing non-transparent media where the light from the illuminating source in the image-digitizing apparatus is reflected from the image-containing medium and this reflected light is imaged on the detector array. This mode of operation involves a two-way passage through the attenuation layer and results in the reflectivity of pixels on the image-containing medium being determined.

What is claimed is:

1. A light-attenuating layer subdivided into regions, each of said regions having a predetermined attenuation for light waves passing through said regions, the ratio of the attenuation of one of said regions to the attenuation of any other of said regions being substantially independent of the wavelength of said light waves.

2. The layer of claim 1 wherein said regions are defined by a rectangular grid consisting of a first set of equally-spaced parallel lines and a second set of equally-spaced parallel lines perpendicular to said first set.

3. The layer of claim 1 wherein each of said regions is comprised of a predetermined thickness of a material absorptive of light waves.

4. The layer of claim 1 wherein said layer is comprised of a photographic film having a predetermined transmissivity in each of said regions.

5. The layer of claim 1 in combination with a transparent support panel wherein said attenuating regions are in intimate contact with said support panel.

6. A light-attenuating layer subdivided into regions, each of said regions having a predetermined attenuation for light waves passing through said regions, each of said regions being comprised of a pattern of a material opaque to light waves, the area of said pattern being a predetermined fraction of the area of said region.

7. A light-attenuating layer subdivided into regions, each of said regions having a predetermined attenuation for light waves passing through said regions, each of said regions being comprised of a pattern of a material absorptive of light waves, said pattern having a predetermined thickness, the area of said pattern being a predetermined fraction of the area of said region.

8. A light-attenuating layer subdivided into regions, each of said regions having a predetermined attenuation for light waves passing through said regions, said regions being organized into groups, all of said groups containing the same number of regions, each region of each of said groups having the same attenuation as corresponding regions in all other of said groups.

9. The layer of claim 8 wherein said regions are defined by a grid consisting of a first set of equally-spaced parallel lines and a second set of equally-spaced parallel lines perpendicular to said first set, said groups being geometrically congruent, said regions of said groups being contiguous.

10. The layer of claim 8 wherein the regions of said groups are ordered in a predetermined way and the attenuations of said ordered regions increase by a predetermined factor from one of said ordered regions to the next.

11. An image digitizing apparatus comprising:
a light source for illuminating an image-containing medium;
a support means comprising a transparent support panel in intimate contact with a light-attenuating layer, said light-attenuating layer being subdivided into regions and adapted to receive in intimate contact an image-containing medium, each of said regions having a predetermined attenuation for light waves passing through said regions;
at least one detector for measuring the light energy incident on said detector during a predetermined time period;
a lens system for imaging the light from at least one of said regions individually on said at least one detector.

12. The apparatus of claim 11 further comprising:
a transport means for positioning said light source, said lens system, and said detector relative to said support means.

13. The apparatus of claim 12 further comprising:
a digital processing means for controlling said transport means and translating the signal levels from said detector into the power levels of the light waves emerging from image-containing medium regions into said light-attenuating layer, said image-containing medium regions being the regions defined by projecting said light-attenuating layer regions onto the image-containing medium.

14. The apparatus of claim 13 wherein said regions of said light-attenuating layer are organized into groups, all of said groups containing the same number of regions, each region of each of said groups having the same attenuation as corresponding regions in all other of said groups.

15. The apparatus of claim 14 wherein the regions of said groups are ordered in a predetermined way and the attenuations of said ordered regions increase by a predetermined factor from one of said ordered regions to the next.

16. The apparatus of claim 15 wherein said digital processing means:

transforms the output signal levels from said detector into the energy values associated with the light incident on said detector;

identifies the region of a selected group having the highest attenuation that produces a light energy value that exceeds a predetermined threshold level; and obtains the power level of light emerging from said image-containing medium into said selected group by multiplying the light energy from said identified region by a scaling factor, said scaling factor being equal to the attenuation of said identified region.

17. A method for obtaining the power level of light emerging from a pixel of an image-containing medium comprising the following steps:

illuminating at least one pixel of an image-containing medium;

dividing the light emerging from said pixel into a plurality of equal portions;

subjecting said portions to different attenuations;

measuring the light power of each of said attenuated portions;

identifying at least one of said attenuated portions for which said light power is in a predetermined range;

multiplying the light power of one of said identified attenuated portions by the attenuation of the same identified attenuated portion thereby obtaining the light power emerging from said pixel divided by the number of said portions into which said pixel light was divided.

18. The method of claim 17 wherein said attenuations of said portions being placed in sequence of increasing attenuation, said attenuations increase by predetermined factors from one to the next and the ratio of the upper end of said predetermined range to the lower end of said range is approximately equal to one of said predetermined factors.

19. A method of using a light-attenuating layer, said layer being subdivided into equal-area regions, each of said regions having a predetermined attenuation for light waves passing through said regions, said regions being organized into groups, all of said groups containing the same number of regions, each region of each of said groups having the same attenuation as corresponding regions in all other of said groups, said method comprising the following steps:

placing the light-attenuating layer in intimate contact with an image-containing medium, said image-containing medium being composed of a plurality of pixels, each of said light-attenuating layer groups being identical in size and shape to the pixel with which said group is in contact;

illuminating said image-containing medium;

measuring the light power emerging from each of said regions of each of said groups;

identifying at least one region of each of said groups for which the emerging light power from said region is in a predetermined range of values;

multiplying the light power emerging from said identified region by the attenuation of said identified region thereby obtaining the light power emerging from the pixel in intimate contact with the group of which said identified region is a member.

* * * * *